Patented Aug. 13, 1935

2,010,857

UNITED STATES PATENT OFFICE 2,010,857

COATED ARTICLE AND METHOD OF MAKING SAME

Norman D. Hanson, Bloomfield, N. J., assignor to Bakelite Corporation, New York, N. Y., a corporation of Delaware No Drawing. Application January 30, 1933, Serial No. 654,363

6 Claims. (Cl. 154—2)

This invention relates to coated articles and methods of manufacturing them. It is more particularly directed to articles in which the coated body portion is apt to be injuriously affected by prolonged heating when the coatings are such as to require heating or baking.

Materials or compositions found preferable for the coating of articles are generally of a nature which require baking or the application of heat in order to bring out their properties in the optimum condition. For instance coating materials of a highly desirable nature are those obtained by reacting polyhydric alcohols with polybasic acids or mixtures of polyhydric and monobasic acids. These products are characterized by an absence of color and a freedom from the tendency to change their color upon exposure to light and air; but in order to bring out these properties and to obtain durable lasting coatings from them it is necessary that they be subjected in the film form to a baking of from 30 minuts to 20 hours or more at elevated temperatures in the neighborhood of 200° C., the length of time and temperature depending upon the condition of the resin when applied. A baking for this length of time precludes the use of base materials of a cellulose nature such as paper on account of the destructive effect upon the cellulose.

I have found that coatings which require baking to the extent that is apt to cause deterioration of the body portion, such as the resinous material mentioned in the foregoing paragraph, can be had without destructive or injurious effect on the body portion when made of paper and the like and with an excellent adherence.

In carrying out the invention the coating material is applied to a polished metal surface such as chromium plated sheets, aluminum foil, etc. The coated metal surface is thereupon baked for the length of time and at the temperature required to obtain an enamel film. The film is thereafter transferred to the base material to be coated.

In order that the invention may be fully understood it is herein illustrated by a specific description of the application of alkyd resins, that is, resins resulting from the reaction of polyhydric alcohols and acids as mentioned above. The invention, however, is not limited to any specific resin or coating material.

A baking lacquer is prepared by initially reacting glycerine with phthalic anhydride in the proportions of 1 part by weight of glycerine to 2 parts by weight of phthalic anhydride. This mixture is preferably reacted with the application of heat until it reaches a temperature of 200 to 210° C. The reaction is then arrested by adding a suitable solvent such as diethyl oxalate. This gives a clear lacquer which can be further diluted with thinners such as acetone. To the solution or lacquer so obtained can be added pigments, dyes or other materials to give a desired enamel. For instance in about 1000 parts of the lacquer solution can be introduced about 500 parts by weight of titanium oxide and 100 parts of silica; in addition coloring material is included, when shades other than white are desired, as for example lakes which are not affected by heating. A chromium plated steel sheet is coated, preferably by dipping or flowing the lacquer or the enamel along the sheet; if sufficiently thin, the solution can be sprayed on the sheet or it can be applied by brushing. It is desirable that the lacquer or enamel be of such viscosity so as to give a film thickness varying between .0005 and .015 inches. The coated plate is dried at 100° C. for about 30 minutes and then at 150° C. for 30 to 60 minutes. If a clear lacquer is used, that is, one to which no opaque fillers has been added, designs can be printed or otherwise applied as the lacquer is at this stage sufficiently dry. A second coating of enamel or lacquer can thereupon be flowed, sprayed, etc., over the film; this coating is preferably an opaque white or colored enamel. The plate is dried at about 125° C. for about ½ hour and for a further period at about 150° C. and finally at about 200° C. until the film is sufficiently hard; but the final heating period may take from 3 to 20 hours. The second coating of enamel is not essential and may be omitted; but it is found that the added coating greatly improves resistance to water, wear and weather, etc., particularly if the first coating is a clear lacquer.

When the baking of the plate is completed it is allowed to cool to room temperature. The baked film is then ready for transferring to a body.

The body or its base portion can be of any desired material, but one found useful and satisfactory for panels, table tops and the like, is a paper sheet or board material containing or impregnated with a phenol formaldehyde resin of the heat-hardening type. A sufficient number of these resin-containing sheets or boards are superposed to give a body or pack of the desired thickness and upon them is placed a bonding paper sheet having a relatively high content of a readily flowing heat-hardenable resin, that is about 50% or more of a phenol-formaldehyde resin which for example, contains plasticizing agents to impart the desired flowing characteristic. The bonding sheet can be impregnated or coated with other suitable agent, such as rubber, an alkyd resin, etc., and the agent need not necessarily be in the form of an impregnated or coated sheet but it can be applied as a solution or other form directly to the body or base or to the baked film or to both; if the film itself is in a sufficiently adhesive condition the interposed bonding agent can be omitted entirely. The lacquer coated metal sheet then is placed on the pack with the lacquer surface in contact therewith and the assembly is then submitted to heat and pressure. With a base portion made up of a resin impregnated pack as here described the temperature should be about 165° C. and the pressure about 800 to 2000 lbs. to the square inch. For an assembly yielding a pressed product of about $\tfrac{1}{16}$ of an inch in thickness the heat and pressure should be applied for about 15 minutes. If a glossy surface is required the product should be cooled before pressure is removed. Upon removal of the pressure it is generally found that the lacquered plate readily releases from the assembly leaving a panel surfaced by the lacquer; it may be, however, that a slight flexing or bending of the pack will be required to secure perfect release.

By the foregoing procedure coated articles can be obtained having a base portion of cellulosic material and a coating of a baking enamel sufficiently baked to bring out the best properties of the enamel and without injury to the cellulose material. A durable water-resistant film not affected by oxidation or other atmospheric conditions is the result. When the enamel is of the alkyd type as herein set forth the film is also characterized by freedom from inherent color and permanency upon exposure to light and air; thereby whites and various pastel shades of a durable lasting color can be had.

The method herein described lends itself to innumerable color effect designs. As indicated above the initial film of clear lacquer can be printed or otherwise tinted or the film can be sprayed or otherwise applied to the polished metal surface in different colors and designs. Further variations can be secured by etching or otherwise forming designs or patterns on the plate or other metal surface to which the coating is applied for baking.

I claim:

1. Method of coating base materials with compositions requiring baking and without subjecting the base materials to the baking operation which comprises applying the composition in liquid form to a metallic surface, baking the composition on the surface into a film, and thereafter transferring the baked film from the surface to the base material.

2. Method of coating base materials with compositions requiring baking and without subjecting the base materials to the baking operation which comprises applying the composition in clear liquid form to a metallic surface baking the composition on the surface into a durable film, applying a design to the film, and thereafter transferring the baked film from the surface to the base material.

3. Method of coating base materials with compositions requiring baking and without subjecting the base materials to the baking operation which comprises applying the composition in liquid form to a metallic surface carrying a design, baking the composition on the surface into a film, and thereafter transferring the baked film from the surface to the base material.

4. Method of preparing coated articles which comprises applying a baking composition in liquid form to a metallic surface, baking the composition on the surface into a film, contacting the film adhesively with a base to be coated, and submitting the assembly to the action of pressure to transfer the film from the surface to the base.

5. Method of preparing coated articles which comprises applying a baking composition to a metallic surface, baking the composition on the surface into a film, placing the film in contact with a heat-hardening base composition, said base composition having a surface for contact with said film characterized by adhesiveness for the film, and subjecting the assembly to the action of heat and pressure to harden the base and transfer the film from the metallic surface to the base.

6. Method of coating base materials with compositions requiring baking and without subjecting the base materials to the baking operation which comprises distributing the composition to be baked on a metallic surface, baking the composition on the surface into a film, and thereafter transferring the baked film from the surface to the base material.

NORMAN D. HANSON.